US007808432B2

(12) United States Patent
Fedora

(10) Patent No.: US 7,808,432 B2
(45) Date of Patent: Oct. 5, 2010

(54) SYSTEMS AND METHODS FOR A HIGH-PRECISION TIME OF ARRIVAL ULTRA-WIDEBAND POSITIONING SYSTEM

(75) Inventor: Neal R. Fedora, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/356,872

(22) Filed: Jan. 21, 2009

(65) Prior Publication Data

US 2009/0213005 A1 Aug. 27, 2009

Related U.S. Application Data

(63) Continuation of application No. 11/359,689, filed on Feb. 22, 2006, now abandoned.

(51) Int. Cl.
*G01S 1/08* (2006.01)
*G01S 1/18* (2006.01)

(52) U.S. Cl. ....................................... 342/386; 342/413

(58) Field of Classification Search ................. 342/386, 342/413
See application file for complete search history.

(56) References Cited

U.S. PATENT DOCUMENTS 5,317,323 A 5/1994 Kennedy et al.
6,054,950 A * 4/2000 Fontana ...................... 342/463
6,373,432 B1 4/2002 Rabinowitz et al.
6,850,187 B1 2/2005 Clark
6,882,315 B2 4/2005 Richley et al.
6,931,055 B1 8/2005 Underbrink et al.
2001/0026241 A1 10/2001 Tamura et al.
2002/0147542 A1 10/2002 Tomescu
2004/0201519 A1 10/2004 Aoki et al.
2005/0090266 A1 4/2005 Sheynblat
2005/0113151 A1 5/2005 Burke et al.
2005/0228613 A1 10/2005 Fullerton et al.
2005/0276255 A1 12/2005 Aiello et al.
2005/0282558 A1 12/2005 Choi et al.
2006/0291537 A1 12/2006 Fullerton et al.
2007/0032832 A1 2/2007 Feher
2007/0077945 A1 4/2007 Sheynblat
2007/0133598 A1 6/2007 Moran

* cited by examiner

*Primary Examiner*—Thomas H Tarcza
*Assistant Examiner*—Harry Liu
(74) *Attorney, Agent, or Firm*—Fogg & Powers LLC

(57) ABSTRACT

Systems and methods for a high-precision time of arrival ultra-wideband positioning system are provided. In one embodiment, a method for generating precision localizer messages for an ultra-wideband time-of-arrival positioning system is provided. The method comprises receiving a signal from an atomically accurate reference, generating a timing signal based on the atomically accurate reference signal, correcting a system time based on the timing signal when an error is detected, and transmitting an ultra-wideband signal having a localization message based on the system time.

18 Claims, 4 Drawing Sheets

SYSTEMS AND METHODS FOR A HIGH-PRECISION TIME OF ARRIVAL ULTRA-WIDEBAND POSITIONING SYSTEM

CROSS-REFERENCE TO RELATED APPLICATIONS

This application is a continuation of U.S. patent application Ser. No. 11/359,689, (pending) filed on Feb. 22, 2006, and entitled "SYSTEMS AND METHODS FOR A HIGH-PRECISION TIME OF ARRIVAL ULTRA-WIDEBAND POSITIONING SYSTEM" (the '689 application). The '689 application is incorporated herein by reference.

BACKGROUND

Current Ultra-Wideband (UWB) positioning systems typically generate range information using either a time of arrival (TOA) method or a time difference of arrival (TDOA) method. The TDOA method requires a mobile unit needing ranging information to contact one or more reference units, and receive a response from one or more reference units. The mobile unit then calculates each range measurement to generate its own position based on the round trip time required to send a request and receive a response. TDOA can obtain a high degree of accuracy, but has the disadvantage of requiring the mobile unit to possess a transmitter of sufficient power to contact the reference units in addition to being susceptible to severe accuracy latencies during the round trip. The disadvantage of TDOA is that the transmitter adds to the complexity, the weight, size, and power requirements of the mobile unit.

TOA methods calculate position based only on the elapsed time required for a signal having a time tag to travel from the one or more reference units to the mobile unit. Thus, TOA methods eliminate the need for a transmitter in the mobile unit, allowing the mobile unit to be a purely passive receiving device. TOA methods considerably reduce the complexity, the weight, size, and power requirements of the mobile unit. To achieve a high degree of accuracy in arriving at a position solution, a mobile unit employing TOA methods is dependent upon the reference units' ability to accurately generate the time tag information which is transmitted to the mobile unit. High precision oscillators, such as atomic clocks, are expensive and thus not practical for installations deploying a significant number of reference units. Thus, other means must be implemented to mitigate this problem.

For the reasons stated above and for other reasons stated below which will become apparent to those skilled in the art upon reading and understanding the specification, there is a need in the art for methods and systems for realizing affordable, high accuracy TOA based UWB positioning systems.

SUMMARY

The Embodiments of the present invention provide methods and systems for methods and systems for realizing affordable TOA based UWB positioning systems and will be understood by reading and studying the following specification.

In one embodiment, a method for generating precision localizer messages for an ultra-wideband time-of-arrival positioning system is provided. The method comprises receiving a signal from an atomically accurate reference; generating a timing signal based on the atomically accurate reference signal; correcting a system time based on the timing signal; and transmitting an ultra-wideband signal having a localization message based on the system time.

In another embodiment, a positioning system is provided. The system comprises one or more reference units each adapted to receive a time signal from at least one atomically accurate reference and maintain a system time based on the time signal, wherein each reference unit is further adapted to transmit a localizer message via an ultra-wideband signal, the localizer message including location information for the reference unit and time information indicating the system time when the localizer message was transmitted; and a mobile receiver unit adapted to calculate a distance to a first reference unit of the one or more reference units based on a first localizer message received from the first reference unit.

In yet another embodiment, a reference unit for a positioning system is provided. The reference unit comprises means for receiving a time signal from an atomically accurate reference; means for generating a periodic timing signal based on the atomically accurate reference signal, the means for generating responsive to the means for receiving; means for maintaining a system time; means for transmitting an ultra-wideband signal having a localization message, wherein the localization message includes location information for the reference unit and time information indicating the system time when the localization message is transmitted; and means for correcting the system time based on a difference between the system time and a time embedded within the timing signal, the means for adjusting responsive to the means for generating a periodic timing signal and the means for maintaining a system time.

In still another embodiment, a computer-readable medium having computer-executable program instructions for a method for generating precision localizer messages for an ultra-wideband time-of-arrival positioning system is provided. The method comprises receiving a signal from an atomically accurate reference; generating a periodic timing signal based on the global atomically accurate reference signal, wherein the timing signal includes a time message that indicates the time the periodic timing is generated; correcting a system time based on a difference between the system time and the time message included within the timing signal; and transmitting an ultra-wideband signal having a localization message based on the system time.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

UWB localizers possess the capability of producing centimeter (cm) accuracy positioning solution, however using the TOA method, accurate measurement of time is a necessity. Embodiments of the present invention mitigate the timing errors found in UWB reference units (commonly referred to as UWB localizers) that typically employ cheaper commercial grade oscillators or other low precision means of generating timing signals.

Embodiments of the present invention benefit the users of UWB positioning systems by providing accurate atomic time signals to the UWB reference units from one or more atomically accurate references, so that the a mobile unit can measure and calculate its own position with high accuracy. Embodiments of the present invention provide centimeter-positioning accuracy, at a low cost, benefiting applications such as, but not limited to, personal tracking/positioning systems within buildings, unmanned vehicle localized positioning and automated vehicle guidance/positioning solutions. Other designs reduce the necessity of utilizing a high accuracy time base because they implement the TDOA method, which measures the time it takes to go roundtrip from a UWB reference unit the receiver. TDOA methods however, require timing coordination between the transmitters and receivers, and are influenced by relative clock drifts and processing delays between them.

Embodiments of the present invention take advantage of atomically accurate references that broadcast highly accurate atomic clock based time signals. Examples of such atomically accurate references include global navigation satellite systems (GNSS), such as the Global Positioning System (GPS), for example. For example, the atomically accurate references provided by GPS satellites are achieved with a combination of cesium (Cs) and rubidium (Rb) atomic clocks. GPS satellites provide civilian access to these atomically accurate references through the GPS Standard Positioning Service (SPS), which maintains time transfer signals with an accuracy to coordinated universal time (UTC) within 340 nanoseconds.

Figure 1:
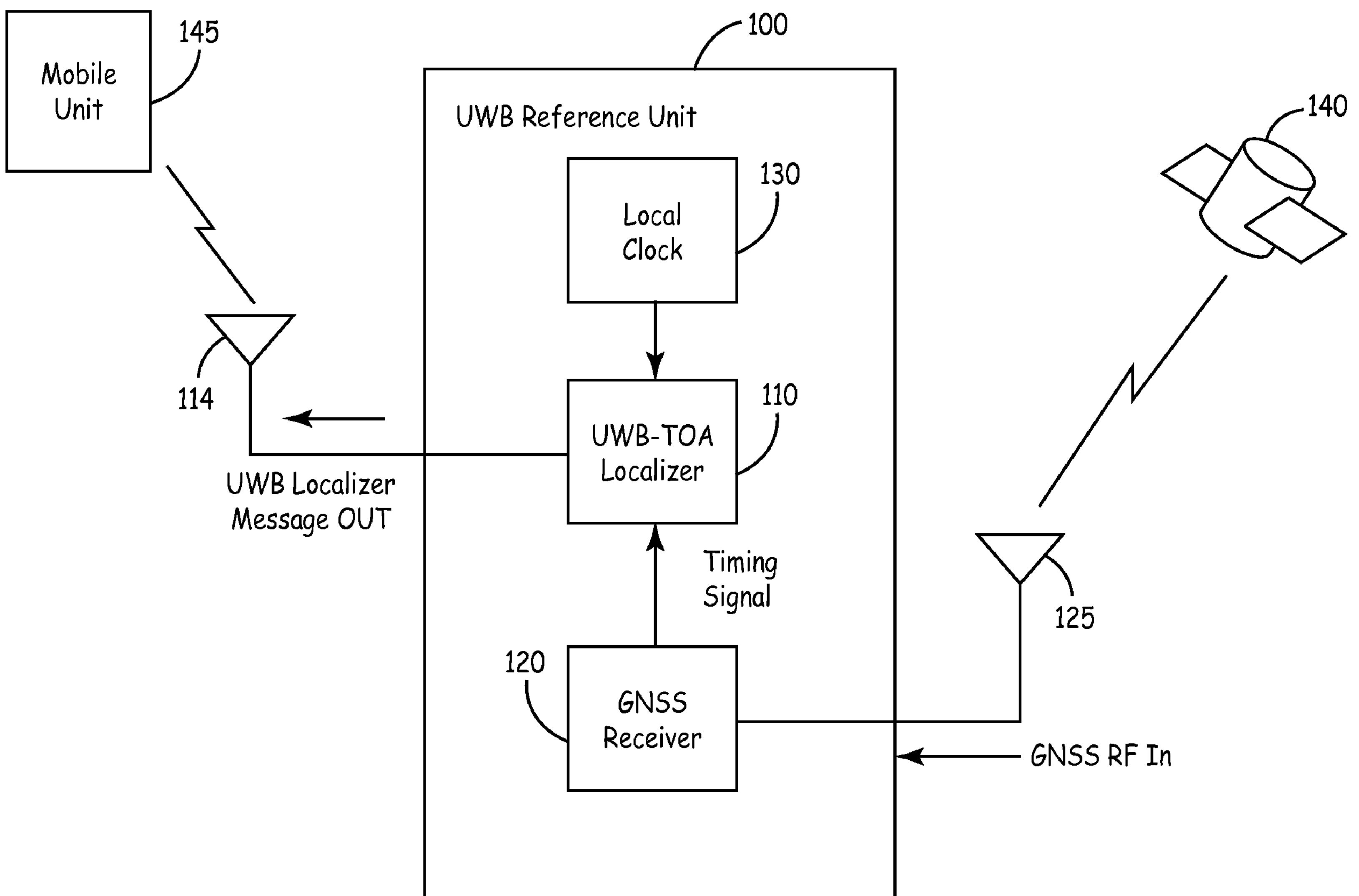
FIG. 1 is a block diagram illustrating a UWB reference unit of one embodiment of the present invention.

FIG. 1 illustrates a UWB reference unit 100 of one embodiment of the present invention. UWB reference unit 100 comprises a UWB-TOA localizer 110 and a UWB antenna 114, a GNSS receiver 120 and GNSS antenna 125, and a local clock 130. In one embodiment, GNSS receiver 120 comprises a chip size GPS receiver. In one embodiment, local clock 130 comprises a low cost crystal oscillator.

In operation, GNSS receiver 120 generates an accurate timing signal based on signals received from at least one GNSS satellite 140, and outputs the timing signal to UWB-TOA localizer 110. In one embodiment, GNSS receiver 120 internally utilizes the timing signal from the GNSS satellites to accurately synchronize its internal time reference with the atomic clock based time signals provided by the GNSS. The timing signal from the GNSS satellite 140 provides the current time based on the GNSS satellite 140's atomic clock. In one embodiment, the timing signal output from GNSS receiver 120 comprises both a periodic timing pulse and a time message that provides the current time. In one embodiment, the periodic timing pulse is a 1 pulse-per-second signal. Although GNSS receiver 120 can generate a timing signal based on a signal received from a single GNSS satellite 140, in other embodiment, the accuracy of the timing signal is increased based on signals from additional GNSS satellites. For example, in one embodiment, where the at least one GNSS satellite 140 includes GPS satellites, an increased accuracy timing signal is generated by GNSS receiver 120 by receiving signals from four or more GPS satellites. As would be appreciated by one skilled in the art, by receiving signals from four or more GPS satellites, GNSS receiver 120 can accurately solve for its own position in three-dimensions and solve for a more accurate time solution than it can based on a signal from a single GPS satellite.

Although FIG. 1 illustrates utilizing a time signal from a GNSS satellite, in other embodiments, other sources for atomically accurate references are used. For example, in one embodiment a UWB reference unit 100 obtains a timing signal via shortwave radio. The National Institute of Standards and Technology (NIST) provides such an atomically accurate reference via shortwave radio that continually broadcasts time signals accurate to within less than 1 microsecond of Coordinated Universal Time (UTC) at the transmitter site.

UWB-TOA localizer 110 maintains a system time that is based on local clock 130. GNSS receiver 120 provides the timing signal to UWB-TOA localizer 110, which in turn "trims" out system time errors caused by local clock 130. As a result, degradation in the precision of local clock 130 becomes negligible because errors are removed with each precise pulse from the timing signal. For example, when the timing signal provides 1 pulse-per-second, clock drift errors in local clock 130 would be removed with each pulse, every second. Thus the error in local clock 130 is limited to the error that can accumulate in the time between periodic timing pulses.

In one embodiment, when the timing signal is received by the UWB-TOA localizer 110 from GNSS receiver 120, it causes an interrupt which generates a time tag record at a corresponding system time. For the next second (assuming a 1 pulse-per-second timing signal, for example purposes only), the system time increments at some predefined clock resolution as required by a specific application. At each interrupt, UWB-TOA localizer 110 trims any accumulated error in the signal from local clock 130 by subtracting from (or adding to) the system time the difference between the time provided by the timing signal and the system time of the time tag record. Based on the system time, UWB-TOA localizer 110 broadcasts a localizer message comprising the position (e.g., the coordinates of) reference unit 100 and the system time when the localizer message was transmitted. UWB-TOA localizer 110 includes the functionalities required to format the localizer message for transmission via a UWB radio frequency (RF) signal and to wirelessly transmit the localizer message via UWB antenna 114. Upon receipt of the localizer message, a mobile unit 145 can calculate its distance from the UWB reference unit 100 based on the time it takes for the localizer message transmitted by UWB reference unit 100 to reach the mobile unit 145, using TOA methods. This time is readily determined by subtracting the system time embedded within the localizer massage from the time at the mobile unit when the localizer message was received.

Figure 2A:
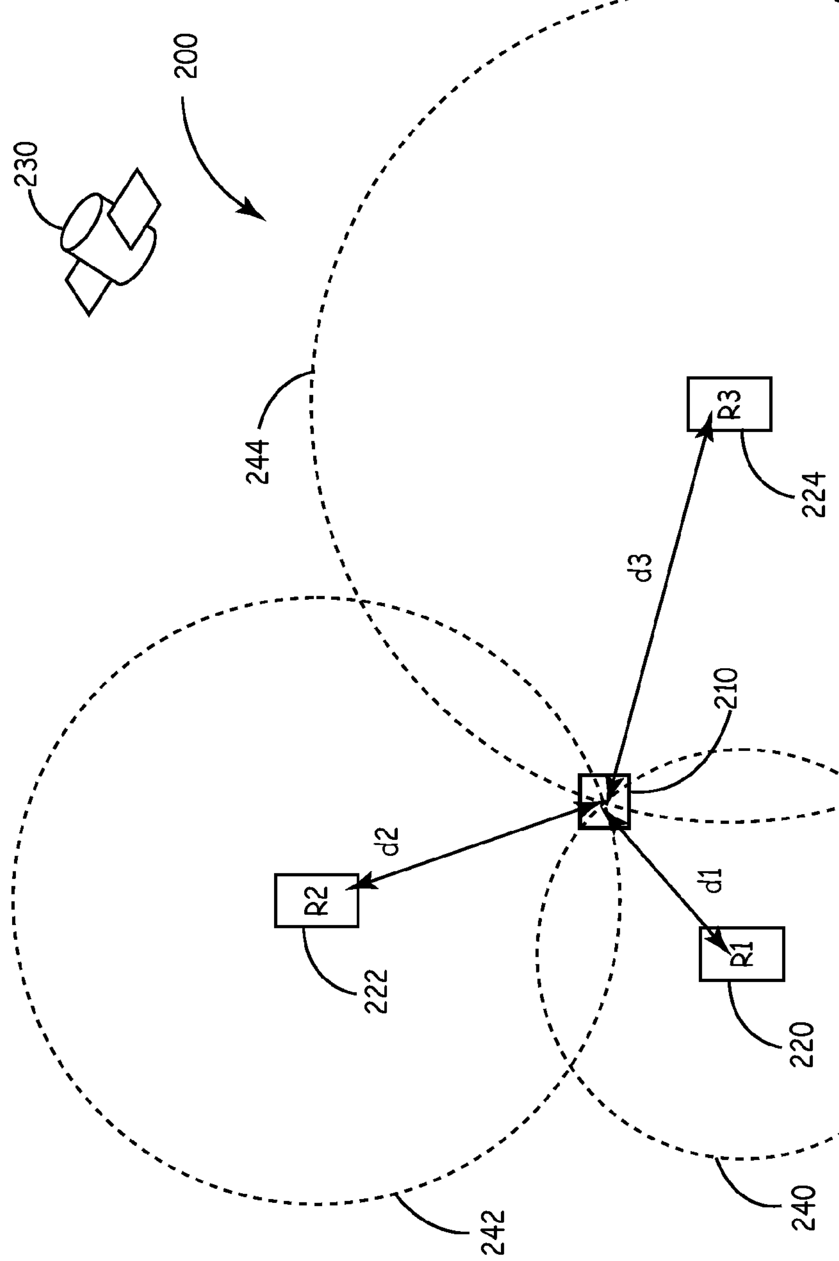
FIGS. 2A and 2B are block diagrams illustrating a UWB positioning system of one embodiment of the present invention.

FIG. 2A illustrates a UWB positioning system 200 of one embodiment of the present invention. System 200 comprises a UWB mobile unit 210, three or more UWB reference units (such as reference units 220, 222, 224) and at least one GNSS satellite 230. UWB reference units 220, 222 and 224 include the functionality of UWB reference unit 100 described above with respect to FIG. 1.

In one embodiment, in operation, each of UWB reference units 220 (shown as R1), 222 (shown as R2) and 224 (shown as R3) receive a timing signal from GNSS satellite 230 and each transmits localizer messages that indicate their locations and a system time. In one embodiment, UWB reference units 220, 222 and 224 synchronize operations so that localizer message signals are transmitted by each UWB reference unit at the same instant. In other embodiments, UWB reference units 220, 222 and 224 transmit localizer message signals asynchronously. Certain localizer message signals, each moving at the speed of light, will take longer to arrive at a mobile unit 210 because their transmitting reference units are farther away from mobile unit 210 than others. Mobile unit 210 includes the functionalities required to receive the UWB radio frequency signals transmitted by UWB reference units 220, 222 and 224 and extract the position and system time information from each localizer message received. Mobile unit 210 calculates the distance to each of reference units 220, 222 and 224 by determining the amount of time it takes for their localizer message signals to reach mobile unit 210, using TOA methods. Signals from three UWB reference units are required for mobile unit 210 to calculate a two-dimensional position and velocity solutions (such as a longitude and latitude, for example). When mobile unit 210 can receive localizer messages and determine distance to at least four UWB reference units, it can calculate its position and velocity in three dimensions.

For example, by determining its distance (d1) from UWB reference unit 220, mobile unit 210 can determine that its position is located somewhere on the surface of a sphere 240 (shown as a circle for illustrative purposes). Similarly, when mobile unit 210 can determine its distance (d2) from UWB reference unit 222 and (d3) from UWB reference unit 224, it can calculate spheres 242 and 244, respectively. Mobile unit 210 can then calculate its own position based on the point of intersection of spheres 240, 242 and 244. Because distances d1, d2 and d3 are calculated as a function of the time it takes for a localizer message to travel from UWB reference units 220, 222, and 224, the accuracy of these distances relies on the accuracy of the system times embedded within each localizer message. Embodiments of the present invention enable a UWB mobile unit to provide highly accurate positioning solutions by reducing the errors and uncertainties associated with the accuracy of the system times. As previously discussed, in other embodiments, UWB reference units 220, 222 and 224 receive signals from multiple GNSS satellites. In one embodiment, this enables UWB reference units 220, 222 and 224 to maintain system times with even a higher accuracy than based on signals from a single GNSS satellite.

Figure 2B:
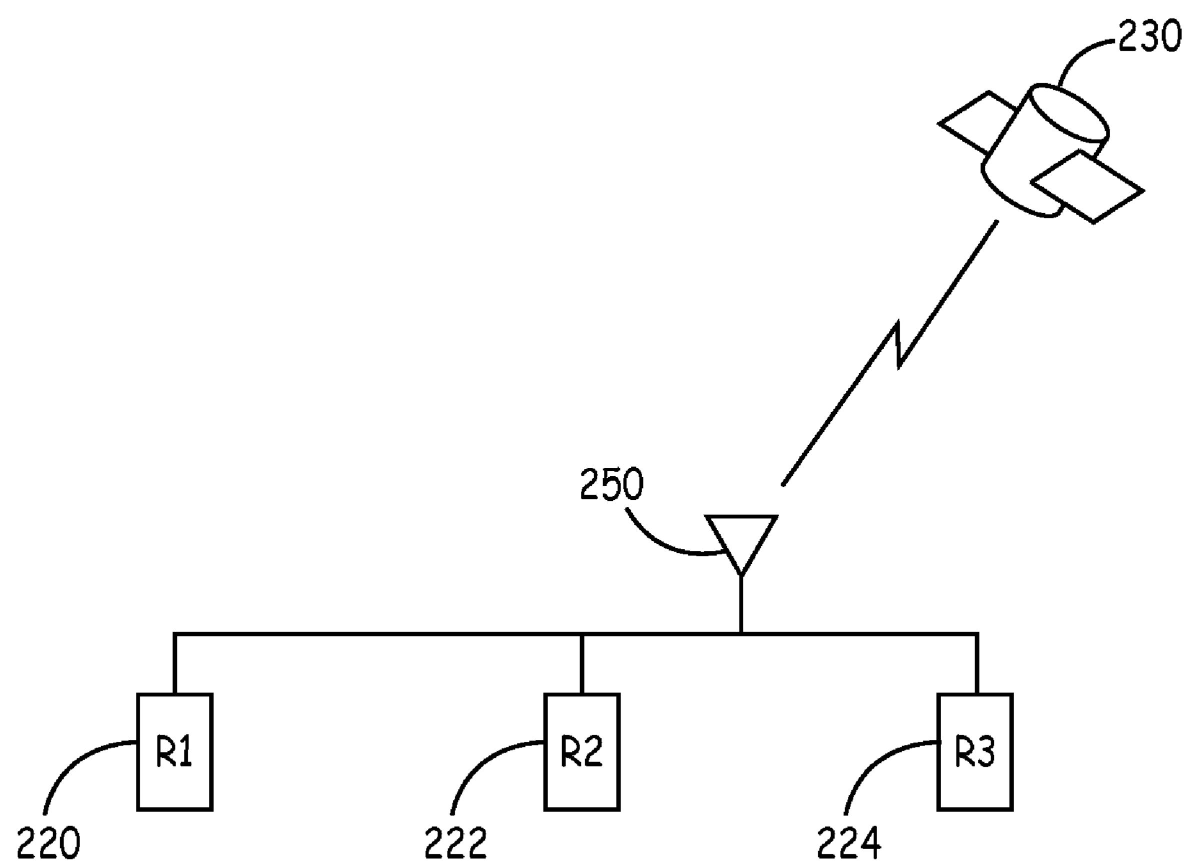

As would be readily appreciated by one skilled in the art, GNSS satellite signals are best suited for line-of-sight reception and the available signal quality quickly degrades inside buildings and other enclosed or underground facilities. One advantage of embodiments of the present invention is that only one GNSS antenna capable of receiving GNSS signals is necessary to provide those signals to one or more UWB reference units of the present invention. For example, as illustrated in FIG. 2B with one GNSS antenna 250 (located on the roof of a building, for example), the GNSS signal received by GNSS antenna 250 is split and routed to multiple UWB reference units as desired (such as UWB reference units 220, 222, and 224 distributed throughout the building, for example). As would be appreciated by a person of ordinary skill in the art upon reading this specification, the distribution of the GNSS signal from GNSS antenna 250 to UWB reference units 220, 222, and 224 can be readily configured to avoid introduction of errors due to signal propagation times or other factors. Other applications of embodiments of the present invention include, but are not limited to navigation aids for persons walking through buildings or cities, tracking persons or property within buildings or other installations, autonomous vehicles, tracking cargo in shipyards, or a high accuracy landing alternative to differential GPS.

Figure 3:
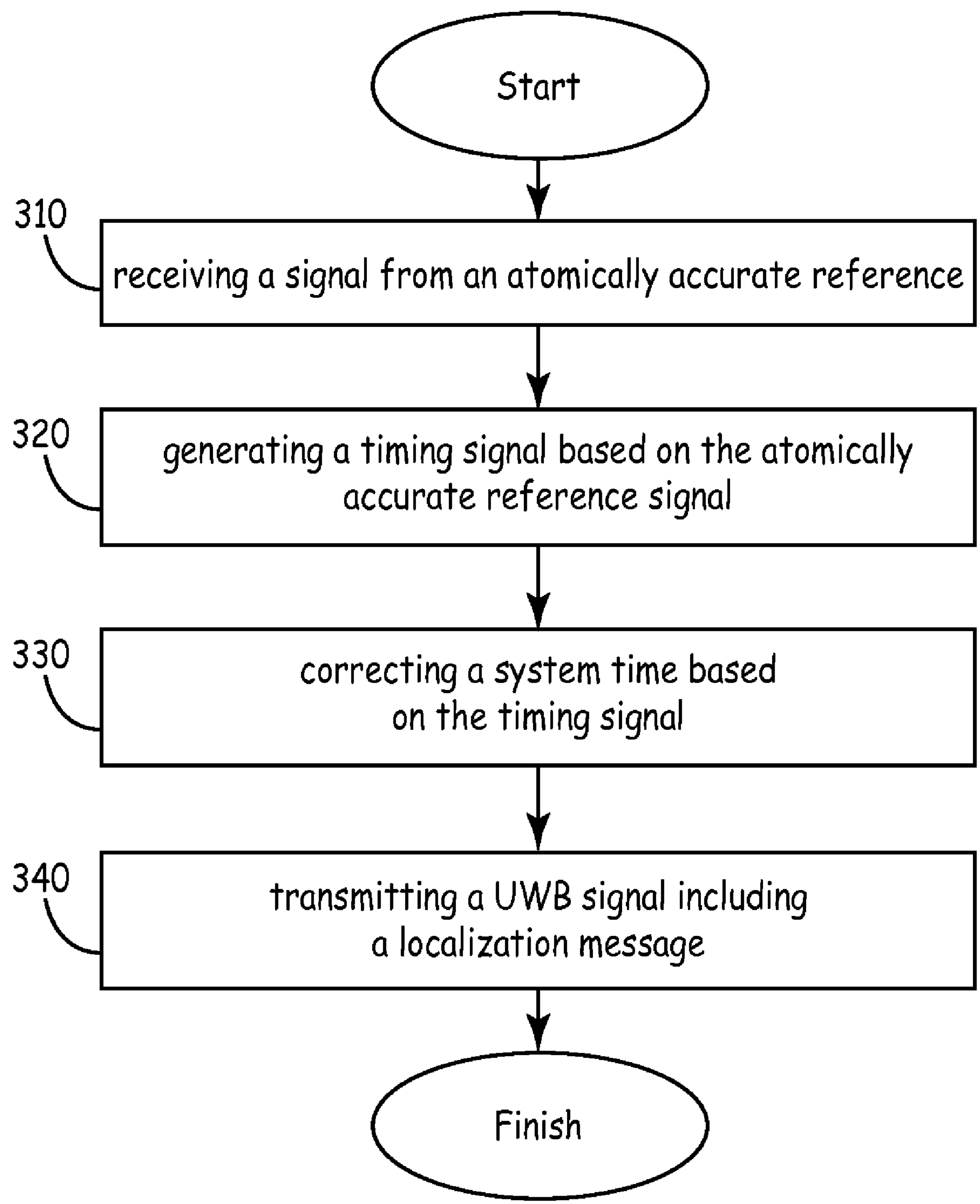
FIG. 3 is a flow chart illustrating a method of one embodiment of the present invention.

FIG. 3 is a block diagram illustrating a method for generating precision localizer messages for an ultra-wideband time-of-arrival (UWB-TOA) positioning system. In one embodiment, the method of FIG. 3 is implemented using the UWB reference unit described with respect to FIG. 1. In other embodiments, other UWB reference units are used. The method begins at 310 with receiving a signal from an atomically accurate reference. As would be appreciated by one skilled in the art upon reading this specification, atomically accurate references such as GNSS satellites utilize highly accurate atomic clocks. Each satellite broadcasts signals that include a time stamp, allowing receivers that decode the signals access to the atomic clock for a timing reference. In one embodiment, the signal is a GPS signal from a GPS satellite. In one embodiment, the signal is a signal from European Galileo GNSS satellite. Embodiments of the present invention are not limited to receiving signals from GPS and Galileo satellites. To the contrary, utilization of time signals from any current or future deployed satellite positioning system, ground based positioning system, or any other atomically accurate reference that broadcasts highly accurate timing signals, is contemplates as within the scope of the present invention.

The method proceeds to 320 with generating a timing signal based on the GNSS signal. The timing signal includes a periodic timing pulse and a time tag message that indicates the time the pulse is valid. In one embodiment, the periodic timing pulse is an integral part of the timing message (for example, the first word of the timing message). In one embodiment, the periodic timing pulse is a 1 pulse-per-second discrete signal.

The method proceeds to 330 with correcting a system time based on the timing signal. In one embodiment, a UWB reference unit maintains the system time based on a local clock, such as, but not limited to a crystal oscillator. Because of imprecision's associated with the local clock, maintaining the system time based only on the local clock would result in the continued accumulation of error which will cause an increasing inaccuracy in the system time. Adjusting the system time each time that a timing signal is generated limits the accumulation of error to that which can occur between timing signals. In the case where the timing signal is generated once per second, the system time is adjusted to agree with the time embedded within the timing signal every second. Thus the inaccuracy of the system time due to the imprecision of the local clock is limited to the error which can accumulate within one second of its own internal clock 130.

The method proceeds to 340 with transmitting a UWB signal including a localization message. In one embodiment, the localization message includes location information that describes the location of the UWB reference unit (for example, the longitude, latitude, and altitude of the UWB reference unit, or another reference frame) and time information that indicates the time when the localization message was transmitted. This time information is based on the system time. Thus, using TOA methods, a receiver that receives the localization message can determine its own distance from the UWB reference unit by noting the difference in the time at which it received the localization message and the time information embedded within the localization message. When the receiver receives the localization message and determines its own distance from at least three different UWB reference units, the receiver can arrive at a positioning solution for its own location, based on the intersection of at least three imaginary spheres centered at the UWB reference units, and having radiuses equal to the distances determined by the receiver. Further, because the time information embedded within the UWB localization messages are ultimately based on highly accurate GNSS signals, the position solution arrived at obtains a high degree of accuracy.

In one embodiment, adjusting the system time based on the timing signal is accomplished by initiating an interrupt when the timing signal is received. The interrupt in turns generates a time tag record that is time stamped with the corresponding system time indicating when the interrupt occurred. The system time normally increments at some predefined clock resolution (for example, once every microsecond) as required by a specific application. A person of ordinary skill in the art, upon reading this specification, can readily determine the system time resolution required for a specific application. Upon the receipt of each interrupt, the UWB reference unit removes any accumulated error by either subtracting from (when the system time is ahead of timing signal time), or adding to (when the system time is behind the timing signal time) the system time the difference between the time provided by the timing signal and the system time of the time tag record.

As would be readily appreciated by one skilled in the art, GNSS satellite signals are best suited for line-of-sight reception and signal quality available quickly degrades inside of buildings or other enclosed or underground facilities. One advantage of embodiments of the present invention is that only one GNSS antenna capable of receiving GNSS signals is necessary to provide those signals to one or more UWB reference units of the present invention. For example, with one antenna on the roof of a building, the GNSS signal received by that antenna can be spit and routed to as many UWB reference units as desired, distributed throughout the building for example. In addition, only a signal from a single GNSS satellite is required. Other applications of embodiments of the present invention include, but are not limited to tracking persons or property within buildings or other installations, autonomous vehicles, tracking cargo in shipyards, or a high accuracy landing alternative to differential GPS.

Several means are available to implement embodiments of the present invention. These means include, but are not limited to, digital computer systems, programmable controllers, or field programmable gate arrays. Therefore other embodiments of the present invention include program instructions resident on computer readable media that when implemented by such controllers, enable the controllers to implement embodiments of the present invention. Computer readable media include any form of computer memory, including but not limited to punch cards, magnetic disk or tape, any optical data storage system, flash read only memory (ROM), nonvolatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for a time-of-arrival positioning system, the method comprising:

receiving from a reference transmitter a localization message that includes precise time data indicating a time when the localization message was transmitted, the precise time data derived from an atomically accurate signal transmitted from an atomically accurate reference, wherein the localization message further includes position data that describes a location of the reference transmitter;

estimating a distance of a mobile unit that receives the localization message to the reference transmitter using a time-of-arrival calculation based on the precise time data and the position data from the localization message;

estimating a position of the mobile unit based on the distance of the mobile unit to the reference transmitter.

2. The method of claim 1, wherein receiving from the reference transmitter the localization message further comprises receiving an ultra-wideband signal from the reference transmitter.

3. The method of claim 1, further comprising:

receiving at the reference transmitter an atomically accurate signal transmitted from the atomically accurate reference;

generating a timing signal at the reference transmitter based on the atomically accurate reference signal;

correcting a system time of a local clock at the reference transmitter based on the timing signal; and transmitting from the reference transmitter the localization message, wherein the precise time data indicates the system time of the local clock when the localization message is transmitted.

4. The method of claim 3, wherein receiving at the reference transmitter an atomically accurate signal comprises at least one of:

receiving a signal from a global positioning system satellite; and receiving a signal from a Galileo system satellite.

5. The method of claim 1, further comprising:

determining a position of the reference transmitter.

6. The method of claim 5, wherein determining a position of the reference transmitter further comprises:

determining a position of the reference transmitter based on a signal from a satellite positioning system.

7. A positioning system, the system comprising:

a plurality of reference transmitters each transmitting localization messages, wherein each localization message includes precise time data indicating a time when each localization message was transmitted;

wherein each of the plurality of reference transmitters derive the precise time data from an atomically accurate signal transmitted from at least one atomically accurate reference;

wherein each of the plurality of reference transmitters include position data for their respective location in the localization messages; and at least one mobile unit having a receiver for receiving the localization messages transmitted by the plurality of reference transmitters, wherein the at least one mobile unit calculates a distance between the at least one mobile unit and a first reference transmitter of the plurality of reference transmitters using a time-of-arrival calculation based on the receipt of a first localizer message.

8. The positioning system of claim 7, the plurality of reference transmitters each comprising:

a receiver for receiving a first timing signal from an atomically accurate reference;

a local clock synchronized to a second timing signal provided by the receiver;

a localizer that derives the precise time data for the localization message based on the local clock.

9. The positioning system of claim 7, wherein the at least one mobile units determines a difference in time between when the first localizer message was transmitted and when the first localizer message was received by the at least one mobile unit.

10. The positioning system of claim 7, wherein one or more of the plurality of reference transmitters are configured to solve for their own position in three-dimensions.

11. The positioning system of claim 10, wherein one or more of the plurality of reference transmitters are configured to solve for their own position in three-dimensions by receiving signals from four or more satellites.

12. The positioning system of claim 7, wherein localization messages transmitted by the plurality of reference transmitters are communicated via ultra-wideband signals.

13. The positioning system of claim 7, wherein the mobile unit estimates a position of the mobile unit based on the distance of the mobile unit to the first reference transmitter.

14. The positioning system of claim 7, wherein the mobile unit estimates a position of the mobile unit based on the distance of the mobile unit to the first reference transmitter and at least two other reference transmitters.

15. A reference transmitting unit for a positioning system, the reference transmitting unit comprising:

means for receiving a first timing signal from an atomically accurate reference;

means for maintaining a system time based on the first timing signal;

means for determining a position of the reference transmitting unit;

means for transmitting a localization message that includes precise time data indicating a time when the localization message was transmitted, based on the means for maintaining a system time, wherein the means for transmitting a localization message further includes in the localization message position data that describes the position of the reference transmitting unit.

16. The reference transmitting unit of claim 15, wherein means for transmitting a localization message further comprises:

means for transmitting the localization message using an ultra-wideband signal.

17. The reference transmitting unit of claim 15, further comprising:

means for generating a timing signal at the reference transmitting unit based on an atomically accurate reference signal from the atomically accurate reference; and means for correcting the system time based on the timing signal.

18. The reference transmitting unit of claim 15, wherein the means for determining a position of the reference transmitting unit further comprising means for receiving a signal from a global positioning system satellite.

* * * * *